Sept. 16, 1958 D. COHEN 2,852,671

METHOD AND APPARATUS FOR FREQUENCY DIVISION

Filed Jan. 23, 1957 2 Sheets-Sheet 1

INVENTOR,
DAVID COHEN.

BY

Harry M. Saragovitz

ATTORNEY.

Sept. 16, 1958 D. COHEN 2,852,671

METHOD AND APPARATUS FOR FREQUENCY DIVISION

Filed Jan. 23, 1957 2 Sheets-Sheet 2

INVENTOR,
DAVID COHEN

BY

Harry M. Saragovitz
ATTORNEY.

2,852,671

METHOD AND APPARATUS FOR FREQUENCY DIVISION

David Cohen, Laurelton, N. Y., assignor to the United States of America as represented by the Secretary of the Army Application January 23, 1957, Serial No. 635,926

4 Claims. (Cl. 250—36)

The present invention relates to a method and apparatus for frequency division, and more particularly to a method and apaparatus for frequency division by heterodyne frequency translation.

Since more and more communication equipment is utilizing the microwave portion of the spectrum, there is a need for greater frequency stability and for accurate means of frequency measurement in the microwave region. There are under development methods of producing high frequency (microwave frequency) standards based on the high long-term stability of molecular resonance. One of the most attractive plans for adapting these standards for the measurement or stabilization of low frequencies (lower microwave frequencies than the standard) is the use of frequency division techniques. This invention is a particular method of frequency division using the heterodyne principle. This method translates the problem of frequency division to a fixed set of intermediate frequencies and uses the combination of conventional divider and multiplier circuits. Input and output frequency selection is made through a tunable local oscillator and output filter.

An object of the present invention is to provide a reliable method and apparatus for frequency division at microwave frequencies.

Another object of the present invention is to provide a method and apparatus for frequency division by heterodyne frequency translation at microwave frequencies.

A further object of the invention is the provision of a frequency multiplier for use at microwave frequencies.

The exact nature of this invention as well as other objects and advantages thereof will be readily apparent from consideration of the following specification relating to the annexed drawing in which.

Figure 1:
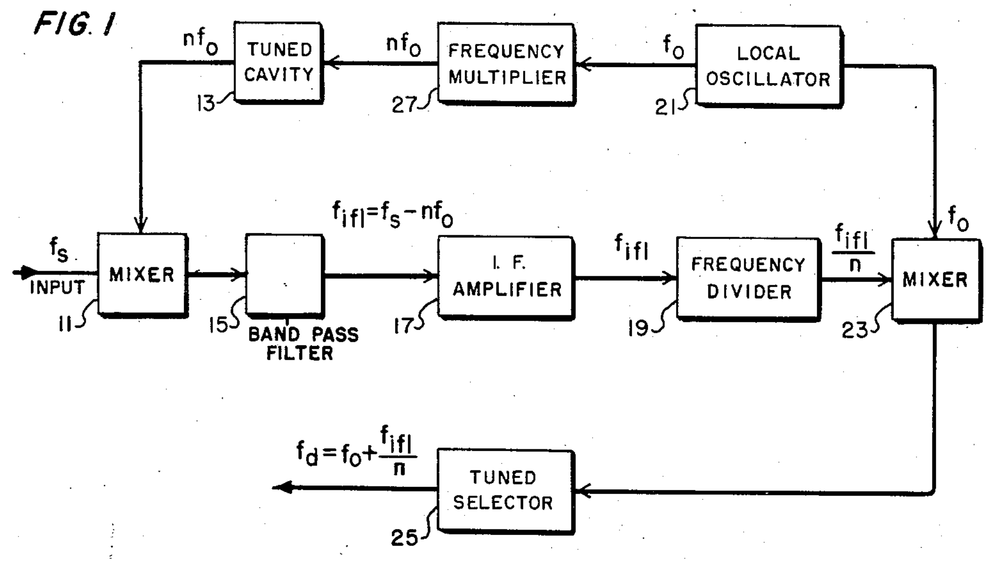
Figure 1 is a block diagram of the preferred embodiment of the invention.

Referring now to the drawings, wherein like reference characters designate like or corresponding parts throughout the several views, there is shown in Figure 1, which illustrates an embodiment, a heterodyne divider comprising mixer 11 having an input signal applied thereto at frequency $f_s$ (microwave frequency) and tuned cavity 13 for applying another signal frequency $nf_o$ (harmonic number $n$ times the fundamental frequency) to mixer 11. The two signals $f_s$ and $nf_o$, mixed in mixer 11, produce sum and difference frequency components; the difference frequency component being $f_{if1}$ (an intermediate frequency), which is the difference between $f_s$ and $nf_o$ ($f_{if1}=f_s-nf_o$), is passed from the output of mixer 11 to band pass filter 15. Band pass filter 15 only allows the signal at frequency $f_{if1}$ to pass therethrough to intermediate frequency amplifier 17. The output after being amplified by intermediate frequency amplifier 17 is applied to a conventional low frequency divider network 19 wherein the intermediate frequency $f_{if1}$ is divided by $n$ (harmonic number) to $$\frac{f_{if1}}{n}$$

This divided frequency signal $$\frac{f_{if1}}{n}$$

is then mixed with the fundamental frequency signal $f_o$, derived from local oscillator 21, in another mixer 23 from which is derived the signal frequency $f_d$ which is the sum of $$\frac{f_{if1}}{n}$$

and $f_o$. This signal frequency $f_d$ is then applied to tuned selector 25 which is tuned to allow the passage of frequency $f_d$. Local oscillator 21 applies frequency $f_o$ to mixer distorter frequency multiplier 27 as well as to mixer 23. The output of the mixer distorter frequency multiplier 27 is then applied as signal frequency $nf_o$ to tuned cavity 13.

In describing the invention numerical values will replace the aforementioned frequency symbols. Two examples will be used to show how the heterodyne principle can be used to divide a microwave frequency by a factor of 4 for example.

Figure 2:
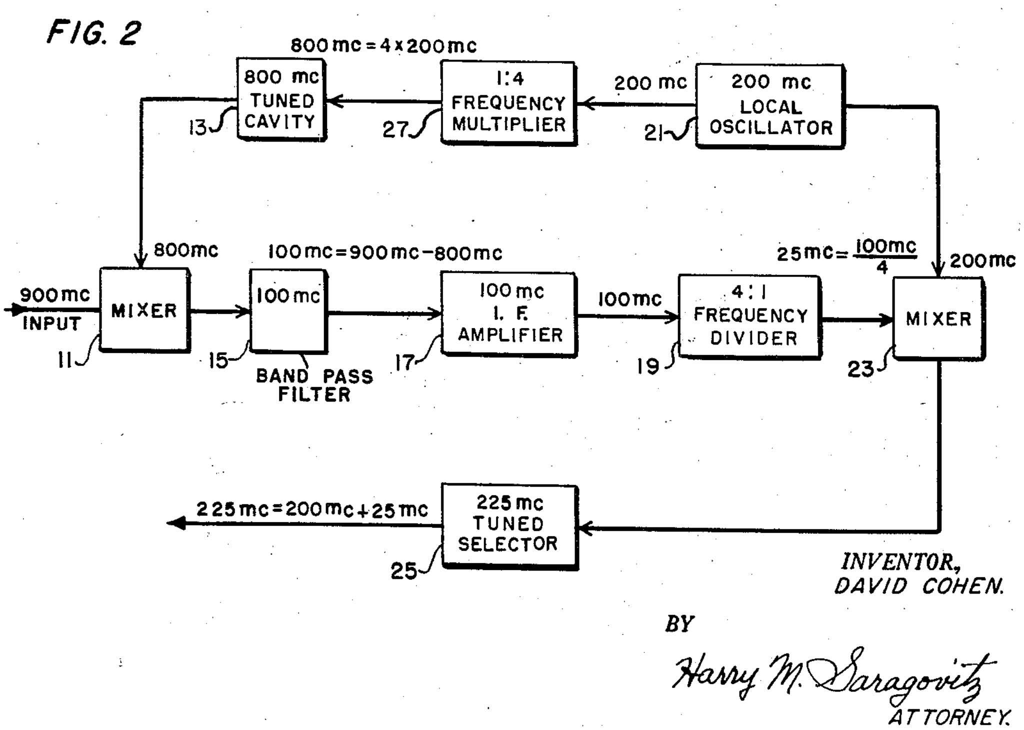
Figures 2 and 3 are the same as Figure 1 with illustrative values of the frequencies shown to illustrate the frequency division.

The first example, depicted in Figure 2, will illustrate how a 900 mc. frequency signal can be divided to a 225 mc. frequency signal while the second example will illustrate how a 880 mc. frequency signal can be divided to a 220 mc. signal. It is believed that these two examples will give a satisfactory explanation of the invention.

In the first example (dividing 900 mc. frequency signal to a 225 mc. frequency signal), the 900 mc. frequency signal is applied to the input of mixer 11. To this same mixer 11 is applied an 800 mc. frequency signal from tuned cavity 13; this 800 mc. frequency signal being developed from a 200 mc. frequency signal being supplied by local oscillator 21 to mixer distorter 27 wherein the 200 mc. frequency signal is multiplied to a 800 mc. frequency signal which is applied to tuned cavity 13.

The difference frequency (900 mc.−800 mc.=100 mc.) from mixer 11 is an intermediate frequency and is passed by band pass filter 15 to high gain intermediate frequency amplifier 17 wherein the 100 mc. intermediate frequency signal is amplified. The 100 mc. amplified intermediate frequency signal is then applied to a 4 to 1 divider network 19 wherein the 100 mc. intermediate frequency signal is divided to a 25 mc. intermediate frequency signal. The 25 mc. intermediate frequency signal with a 200 mc. frequency signal supplied by local oscillator 21 are mixed in mixer 23. The sum frequency signal output of mixer 23 (25 mc.+200 mc.=225 mc.) is then applied to tuned selector 25 which is tuned to allow the passage of the 225 mc. frequency signal.

Figure 3:
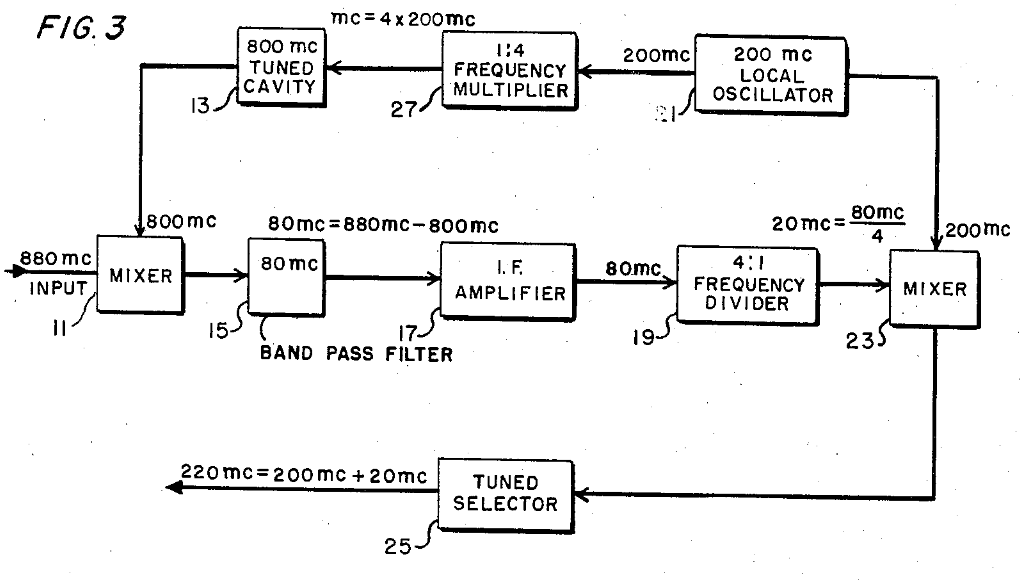

The second example depicted in Figure 3 operates substantially the same as the first example depicted in Figure 2 except that the input signal to mixer 11 is a 880 mc. frequency signal instead of 900 mc. frequency signal, the band pass filter 15 and intermediate frequency amplifier 17 are tuned to 80 mc. instead of 100 mc., the divider network 19 divides down to 20 mc. instead of 25 mc., and mixer 23 applies the sum frequency 220 mc. (200 mc.+20 mc.=220 mc.) instead of 225 mc. (200 mc.+25 mc.=225 mc.) to tuned selector 25.

In the preferred embodiment mixer 11 is in 1N21B crystal mixer, divider network 19 is a regenerative divider, mixer 23 is a 1N25 crystal mixer, and crystal distorter frequency multiplier 27 comprises a 1N21B crystal multiplier.

Figure 4:
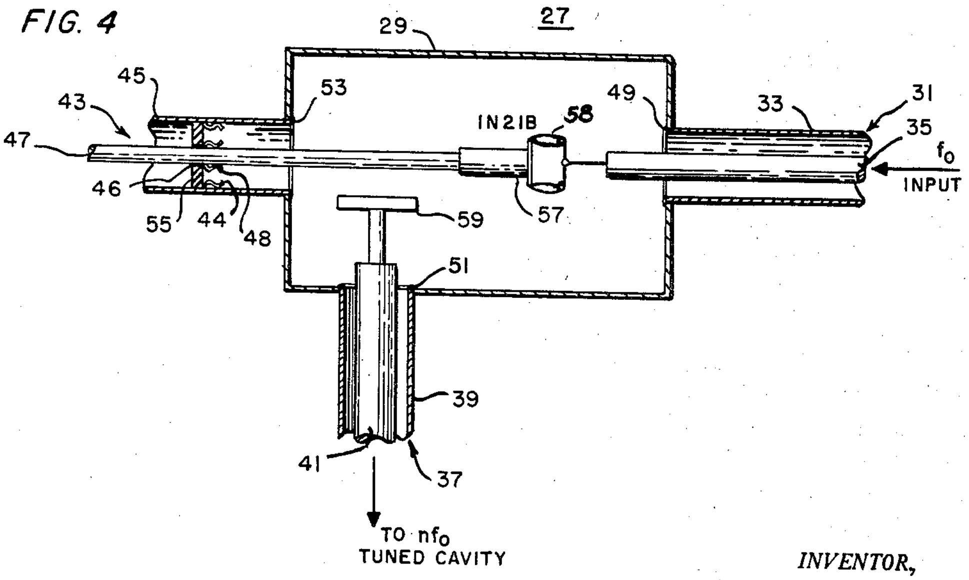
Figure 4 is a schematic diagram, partly in section, of the crystal distorter frequency multiplier which is one of the blocks of Figure 1.

The preferred embodiment of the crystal (mixer) distorter frequency multiplier 27 is depicted in Figure 4 as comprising a shielded housing 29, a first coaxial cable 31 having outer conductor 33 and inner conductor 35, a second coaxial cable 37 having outer conductor 39 and inner conductor 41 and a third coaxial cable 43 having outer conductor 45 and inner conductor 47. The coaxial cables 31, 37 and 43 are connected respectively to portions 49, 51 and 53 of shielded housing 29.

Connected between outer conductor 45 and inner conductor 47 of coaxial cable 43 is shorting bar 55. Shorting bar 55 acts to allow coaxial cable 43 to behave as an adjustable tuning stub and electrically connects to outer conductor 45 of coaxial cable 43 by a plurality of electrical conductive, resilient fingers 44 connected substantially at the periphery of shorting bar 55. Shorting bar 55 further has an aperture 46 therethrough substantially at the center thereof to allow inner conductor 47 of coaxial cable 43 to pass therethrough. Electrical contact between shorting bar 55 and inner conductor 47 of coaxial cable 43 is made through a plurality of electrically conductive, resilient fingers 48 which are electrically and mechanically connected to shorting bar 55 close to the aperture 46 therein.

Contained within shielded housing 29 are crystal distorter 57 (1N21B) and series button coupling condenser 58 which are connected between the inner conductor 35 of coaxial cable 31 and inner conductor 47 of coaxial cable 43.

Inner conductor 41 of coaxial cable 37 has an end 59 thereof for capacitive coupling to the crystal distorter 57.

Coaxial cable 31 is electrically connected to local oscillator 21, and coaxial cable 37 is electrically connected to tuned cavity 13.

The frequency multiplier 29 operates as follows:

Local oscillator 21 applies, e. g., a 200 mc. input signal through coaxial cable 31 to crystal distorter 57. Coaxial cable 43 having shorting bar 55 connected between outer conductor 45 and inner conductor 43 acts as a tuning or adjustable stub and is tuned to, e. g., 800 mc., the 4th harmonic of local oscillator 21. Thus, as per the example, the 4th harmonic of the local oscillator 21 is applied through end 59 of inner conductor 41 of coaxial cable 37 by capacitive coupling (i. e., end 59 of inner conductor 41 acts as a capacitive probe) to cavity (tunable filter) 13 from where the 800 mc., which is the 4th harmonic of local oscillator 21, is available for input mixing.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A frequency dividing network for use in the microwave frequency region comprising a first mixer having a signal applied thereto at a frequency $f_s$; a tuned cavity connected to said first mixer and tuned to frequency $nf_o$; a mixer distorter frequency multiplier connected to said tuned cavity; a local oscillator connected to said frequency multiplier and applying thereto a signal of frequency $f_o$, said mixer distorter frequency multiplier having an output signal therefrom at a frequency $nf_o$ applied to said tuned cavity, said tuned cavity applying said signal at frequency $nf_o$ to said first mixer, said first mixer having an output signal at a difference frequency $f_{if1}=f_s-nf_o$; an intermediate frequency amplifier, a band pass filter connected between said first mixer and said amplifier for passing said difference frequency output $f_{if1}$ therebetween; a frequency divider network connected to the output of said amplifier; a second mixer connected to said local oscillator and to said frequency divider for receiving the output therefrom, said frequency divider network having an output signal at frequency $$\frac{f_{if1}}{n}$$

said local oscillator applying an output signal at frequency $f_o$ to said second mixer, said second mixer having an output signal at frequency $f_d$ equal to $$f_0+\frac{f_{if1}}{n}$$

and a tuned selector connected to said second mixer and tuned to frequency $f_d$.

2. The frequency dividing network of claim 1 wherein said mixer distorter frequency multiplier comprises a shielded housing; first, second and third coaxial cables, each of said coaxial cables having inner and outer conductors, said outer conductors of said coaxial cables connected to portions of said shielded housing; a crystal distorter electrically connected between said inner conductor of said first coaxial cable and said inner conductor of said second coaxial cable and contained within said shielded housing; a shorting bar connected between said inner and said outer conductor of said second coaxial cable to adjust the electrical length of said second coaxial cable, said local oscillator applying said signal of frequency $f_o$ to said first coaxial cable; a capacitive probe forming an end of said inner conductor of said third coaxial cable to couple the output from said crystal distorter to said tuned cavity at frequency $nf_o$.

3. The frequency divider network of claim 2 wherein said shorting bar has an aperture therethrough for allowing said inner conductor of said second coaxial cable to pass therethrough, said shorting bar being electrically connected to said outer conductor of said second coaxial cable by a first plurality of electrically conductive, resilient fingers attached to the outer periphery of said shorting bar and being electrically connected to said inner conductor of said second coaxial cable by a second plurality of electrically conductive, resilient fingers attached near said aperture.

4. An apparatus for frequency division by heterodyne frequency translation comprising a first mixer having a high microwave frequency signal applied thereto; a local oscillator tuned to a lower microwave frequency; a mixer distorter frequency multiplier connected to said local oscillator and having applied thereto the output therefrom, said mixer distorter frequency multiplier multiplying said lower microwave frequency to form a new microwave frequency; a cavity connected between said first mixer and said frequency multiplier, said cavity being tuned to said new microwave frequency thereby passing said signal of said new microwave frequency to said first mixer; a band pass filter tuned to the frequency difference between said high microwave frequency and said new microwave frequency, said band pass filter connected to said first mixer to recive the output therefrom; an intermediate frequency amplifier electrically connected to said band pass filter and tuned to said difference frequency; a frequency divider electrically connected to said intermediate frequency amplifier for dividing said amplified difference frequency to a lower frequency; a second mixer having electrically connected thereto said frequency divider and said local oscillator for mixing the output from said frequency divider and said local oscillator; and a tuned selector connected to said second mixer for receiving the sum output therefrom.

References Cited in the file of this patent

UNITED STATES PATENTS

| | | |
|---|---|---|
| 2,369,268 | Trevor | Feb. 13, 1945 |
| 2,406,932 | Tunick | Sept. 3, 1946 |